(12) United States Patent
Fujii et al.

(10) Patent No.: US 9,152,343 B2
(45) Date of Patent: Oct. 6, 2015

(54) INFORMATION PROCESSING SYSTEM THAT INCLUDES MULTIPLE INFORMATION PROCESSORS AND EXECUTES PROCESS ACCORDING TO REQUEST RECEIVED VIA NETWORK, AND INFORMATION PROCESSING METHOD THEREIN

(71) Applicants: Michiko Fujii, Tokyo (JP); Tatsuya Shirai, Kanagawa (JP)

(72) Inventors: Michiko Fujii, Tokyo (JP); Tatsuya Shirai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1 day.

(21) Appl. No.: 14/169,197

(22) Filed: Jan. 31, 2014

(65) Prior Publication Data

US 2014/0223124 A1    Aug. 7, 2014

(30) Foreign Application Priority Data

Feb. 6, 2013   (JP) ................................ 2013-021420
Jan. 15, 2014  (JP) ................................ 2014-004887

(51) Int. Cl.
*G06F 13/12* (2006.01)
*G06F 13/00* (2006.01)
*G06F 3/06* (2006.01)

(52) U.S. Cl.
CPC ............... *G06F 3/065* (2013.01); *G06F 3/067* (2013.01); *G06F 3/0619* (2013.01)

(58) Field of Classification Search
None
See application file for complete search history.

(56) References Cited

U.S. PATENT DOCUMENTS 8,886,353 B2 * 11/2014 Prigge et al. .................. 700/214
2011/0205586 A1    8/2011 Takahashi et al.

FOREIGN PATENT DOCUMENTS

JP           2011-192250          9/2011

OTHER PUBLICATIONS

Bobulous; Creating an rsync backup script; Dec. 18, 2011; http://web.archive.org/web/20111218195832/http://www.bobulous.org.uk/misc/rsync-backup.html.*

* cited by examiner

*Primary Examiner* — Idriss N Alrobaye
*Assistant Examiner* — Richard B Franklin
(74) *Attorney, Agent, or Firm* — IPUSA, PLLC (57) ABSTRACT

An information processing system includes multiple information processors. Each of the information processors includes a control part configured to periodically store a duplicate copy of at least part of predetermined information stored inside the information processor in a first storage part. The control part is configured to cause the first storage part to be operable from the information processor prior to storing the duplicate copy in the first storage part, store the duplicate copy after causing the first storage part to be operable, and cause the first storage part to be inoperable from the information processor after completion of storing the duplicate copy.

4 Claims, 10 Drawing Sheets

| | | COMMUNICATION DESTINATION SEGMENT | | | | | |
|---|---|---|---|---|---|---|---|
| | | INTERNET | APPLICATION | COMMON SERVICE | DATABASE | MANAGEMENT | OPERATION |
| COMMUNI-CATION SOURCE SEGMENT | INTERNET | | HTTP | HTTP (AUTHEN-TICATION ONLY) | | | |
| | APPLICATION | | HTTP | HTTP LOG TRANSFER | HTTP SQL | | |
| | COMMON SERVICE | HTTP (TO EXTERNAL STORAGE) | HTTP | HTTP LOG TRANSFER | HTTP SQL LOG TRANSFER | | HTTP |
| | DATABASE | | | LOG TRANSFER | SQL | | |
| | MANAGEMENT | | HTTP SSH | HTTP SSH | HTTP SSH | | |
| | OPERATION | | HTTP | HTTP | | HTTP SSH | |

FIG.6

| URL PATH | GATEWAY TYPE | | | | | |
|---|---|---|---|---|---|---|
| | INTERNET GATEWAY | OPERATION GATEWAY | MANAGEMENT GATEWAY | APPLICATION GATEWAY | COMMON SERVICE GATEWAY | DATABASE GATEWAY |
| /portal | APPLICATION SERVER*1 | APPLICATION SERVER*1 | | APPLICATION SERVER | | — |
| /scan | DOMAIN-SPECIFIC SERVER*1 | DOMAIN-SPECIFIC SERVER*1 | — | DOMAIN-SPECIFIC SERVER | | — |
| /print | DOMAIN-SPECIFIC SERVER*1 | DOMAIN-SPECIFIC SERVER*1 | — | DOMAIN-SPECIFIC SERVER | | — |
| /auth/* | MANAGEMENT SERVER (AUTHENTICATION PART)*1 | MANAGEMENT SERVER (AUTHENTICATION PART)*1 | MANAGEMENT SERVER (AUTHENTICATION PART) | | MANAGEMENT SERVER (AUTHENTICATION PART) | — |
| /openam/* | — | — | — | — | MANAGEMENT SERVER (AUTHENTICATION PART) | — |
| /riflex/* | — | — | — | — | QUEUE SERVER | — |
| /accountex/* | — | — | — | — | MANAGEMENT SERVER (AUTHENTICATION PART) | — |
| /syncconv/* | — | — | — | — | — | TEMPORARY IMAGE STORAGE SERVER |
| /lm/* | — | — | MANAGEMENT SERVER (AUTHENTICATION PART)*2 | — | MANAGEMENT SERVER (AUTHENTICATION PART) | — |
| /logviewew | — | LOG COLLECTION SERVER*1 | — | — | — | — |

INFORMATION PROCESSING SYSTEM THAT INCLUDES MULTIPLE INFORMATION PROCESSORS AND EXECUTES PROCESS ACCORDING TO REQUEST RECEIVED VIA NETWORK, AND INFORMATION PROCESSING METHOD THEREIN

CROSS-REFERENCE TO RELATED APPLICATIONS

The present application is based upon and claims the benefit of priority of Japanese Patent Applications No. 2013-021420, filed on Feb. 6, 2013, and No. 2014-004887, filed on Jan. 15, 2014, the entire contents of which are incorporated herein by reference.

BACKGROUND OF THE INVENTION

1. Field of the Invention

The present invention relates to information processing systems and methods.

2. Description of the Related Art

Recently, it has been becoming popular to provide services using software provided on a network such as the Internet without execution of application programs in information processors directly operated by users. Cloud services are known as such form of providing services.

Reference may be made to, for example, Japanese Laid-Open Patent Application No. 2011-192250 for related art.

SUMMARY OF THE INVENTION

According to an aspect of the invention, an information processing system includes multiple information processors, where each of the information processors includes a control part configured to periodically store a duplicate copy of at least part of predetermined information stored inside the information processor in a first storage part. The control part is configured to cause the first storage part to be operable from the information processor prior to storing the duplicate copy in the first storage part, store the duplicate copy after causing the first storage part to be operable, and cause the first storage part to be inoperable from the information processor after completion of storing the duplicate copy.

According to an aspect of the present invention, an information processing method in an information system, which includes an information processor including a control part configured to periodically store a duplicate copy of at least part of predetermined information stored inside the information processor in a first storage part, includes causing, by the control part, the first storage part to be operable from the information processor prior to storing the duplicate copy in the first storage part, storing, by the control part, the duplicate copy after causing the first storage part to be operable, and causing, by the control part, the first storage part to be inoperable from the information processor after completion of storing the duplicate copy.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Computers that provide cloud services contain various kinds of log information and configuration information. Such log information serves as important materials for analyzing the cause of a failure when it occurs, and may contain information on users. Accordingly, it is desirable that the log information be safely managed in a condition that makes it difficult to externally access the log information.

According to an aspect of the present invention, the security of data stored in a computer that provides services via a network is improved.

Figure 1:
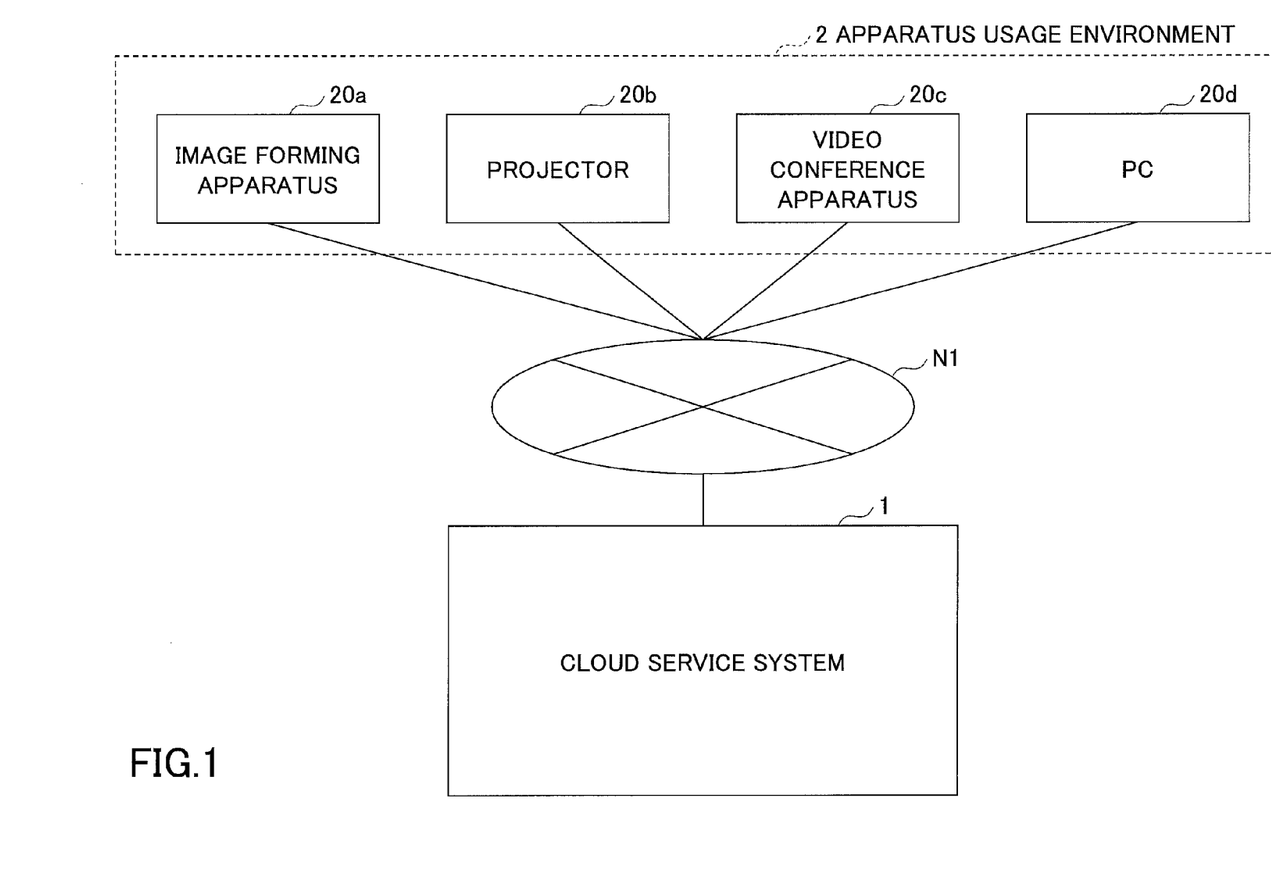
FIG. 1 is a diagram for illustrating the relationship between a cloud service system and apparatuses according to an embodiment of the present invention.

A description is given below, with reference to the accompanying drawings, of embodiments of the present invention. FIG. 1 is a diagram for illustrating the relationship between a cloud service system and apparatuses according to an embodiment of the present invention. Referring to FIG. 1, a cloud service system 1 and apparatuses in an apparatus usage environment 2 are connected by a network N1 such as a wide area network (WAN) typified by the Internet, so as to be able to communicate with each other.

The apparatus usage environment 2 is an environment where apparatuses capable of cooperating with services provided by the cloud service system 1 are used. Examples of the apparatus usage environment 2 include an office or the like in an enterprise. Referring to FIG. 1, the apparatus usage environment 2 includes an image forming apparatus 20a, a projector 20b, a video conference apparatus 20c, and a personal computer (PC) 20d as examples of apparatuses. Hereinafter, the image forming apparatus 20a, the projector 20b, the video conference apparatus 20c, and the PC 20d may be collectively referred to as "apparatuses 20."

The image forming apparatus 20a is, for example, a multifunction machine, a printer, a scanner, a facsimile machine or the like. The projector 20b is an apparatus that projects image data. The video conference apparatus 20c is an apparatus used in a video conference. Embodiments of the present invention may also be applied to apparatuses other than the apparatuses 20 illustrated in FIG. 1.

The PC 20d is a common PC.

The cloud service system 1 is a group of one or more computers (information processors) that provide various kinds of services with which the apparatuses 20 are capable of cooperating (hereinafter referred to as "apparatus cooperation services") as cloud services. Examples of apparatus cooperation services include the service of storing image data scanned by and transferred from the image forming apparatus 20a in a predetermined storage (hereinafter referred to as "cloud scan service") and the service of causing the image forming apparatus 20a to download print data uploaded in advance to the cloud service system 1 and to execute a print job based on the print data (hereinafter referred to as "cloud print service").

The apparatus cooperation services may not be necessarily provided as cloud services. For example, the cloud service system 1 may be a server-side system in a common client/server system. Furthermore, the network N1 may be a local area network (LAN).

Figure 2:
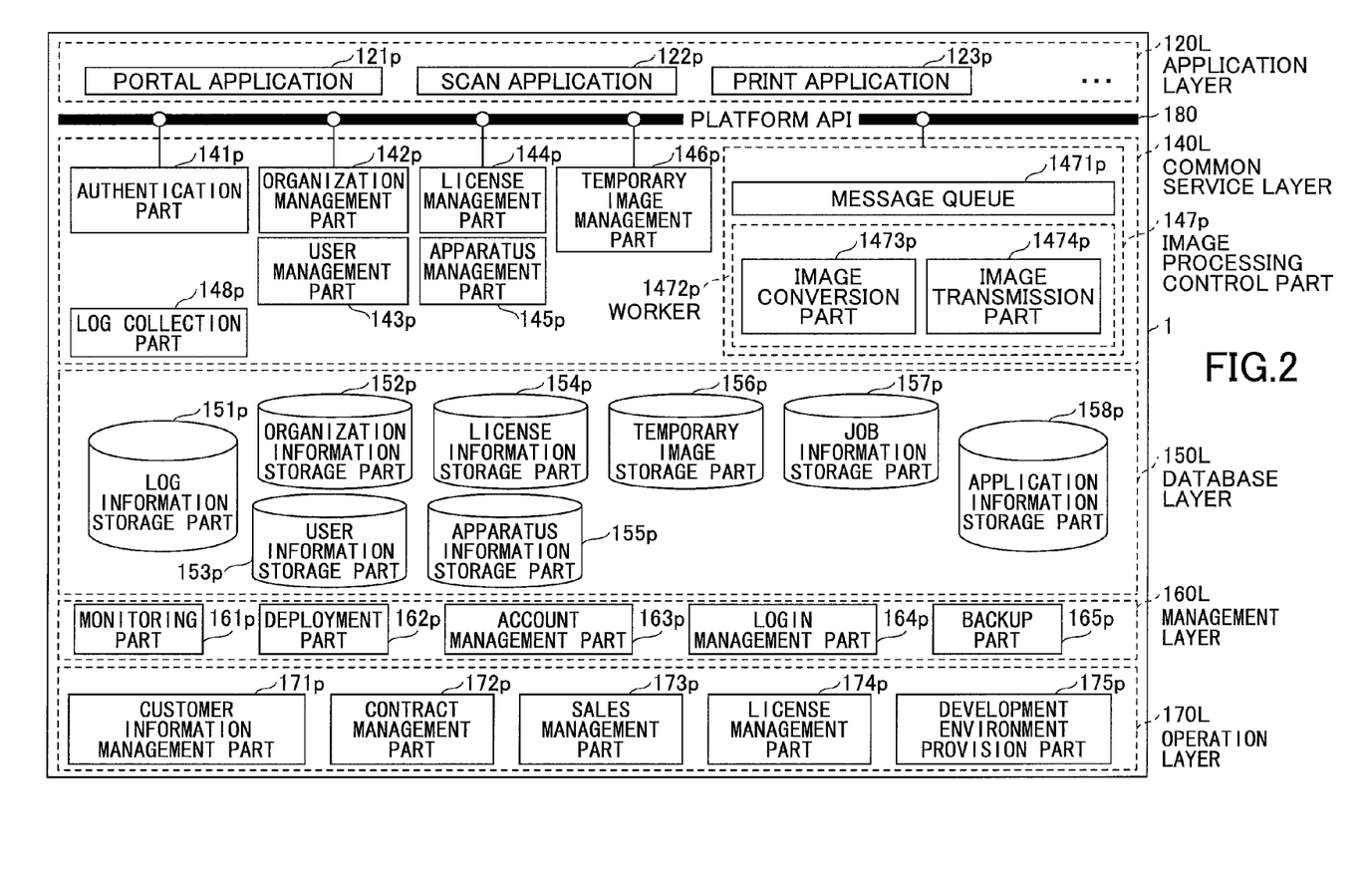
FIG. 2 is a diagram illustrating a first functional configuration of a cloud service system according to an embodiment of the present invention.

FIG. 2 is a diagram illustrating a first functional configuration of a cloud service system according to an embodiment of the present invention.

The functions of the cloud service system 1 are classified into five layers, which are an application layer 120L, a common service layer 140L, a database layer 150L, a management layer 160L, and an operation layer 170L. Of these, the three layers of the application layer 120L, the common service layer 140L, and the database layer 150L are directly related to the provision of apparatus cooperation services. On the other hand, the management layer 160L and the operation layer 170L are layers related mainly to the maintenance, management, development or the like of the cloud service system 1.

The application layer 120L is a layer in which server-side applications (hereinafter referred to as "server applications") related to apparatus cooperation services are implemented. Referring to FIG. 2, the application layer 120L includes a portal application 121p, a scan application 122p, and a print application 123p. The portal application 121p is a server application that provides the portal sites of apparatus cooperation services. In the portal sites, it is possible to register user information and set configuration information with respect to server applications user by user. The scan application 122p is a server application that executes a server-side process with respect to the above-described cloud scan service. The print application 123p is a server application that executes a server-side process with respect to the above-described cloud print service.

The common service layer 140L is a layer that includes functions common to multiple server applications or basic functions used by multiple server applications. The functions of the common service layer 140L may be called through a platform application programming interface (API) 180. The platform API 180 is basically called from a server application in the application layer 120L. The platform API 180 may be made open to a third-party vendor different from the operator of the cloud service system 1. In this case, server applications may be implemented by the third-party vendor. That is, server applications are suitably developed and added using the platform API 180.

Referring to FIG. 2, the common service layer 140L includes an authentication part 141p, an organization management part 142p, a user management part 143p, a license management part 144p, an apparatus management part 145p, a temporary image management part 146p, an image processing control part 147p, and a log collection part 148p.

The authentication part 141p performs authentication and authorization with respect to users and the apparatuses 20 that access the cloud service system 1. The authorization includes determining whether to authorize a user or apparatus 20 to access a service that is an access target. For example, the authorization is performed based on the presence or absence of a license for a service that is a target access.

The organization management part 142p, the user management part 143p, the license management part 144p, the apparatus management part 145p and the temporary image management part 146p provide access to an organization information storage part 152p, a user information storage part 153p, a license information storage part 154p, an apparatus information storage part 155p, and a temporary image storage part 156p, respectively, in the database layer 150L. The access provides an interface for writing information to and reading information from a corresponding storage part.

The image processing control part 147p controls a workflow with respect to the processing of data such as image data. The workflow with respect to image processing refers to a process flow constituted by sequencing one or more processing units whose target of processing is data. The image processing control part 147p includes a message queue 1471p and workers 1472p. The workers 1472p execute processing on data. Referring to FIG. 2, an image conversion part 1473p and an image transmission part 1474p are illustrated as examples of the workers 1472p. The image conversion part 1473p converts data formats and performs optical character recognition (OCR) with respect to data. The image transmission part 1474p transmits image data to an online storage or the like outside the cloud service system 1, for example. Each of the image conversion part 1473p and the image transmission part 1474p, which is indicated by a single rectangle in FIG. 2, may be implemented function by function in different software modules.

The message queue 1471p manages requests for processing (processing requests) to the workers 1472p using a storage area of a queue structure. The message queue 1471p, which is indicated by a single rectangle in FIG. 2, may be provided for each worker 1472p. That is, the message queue 1471p may be provided in correlation with the corresponding worker 1472p. The transmission of processing requests stored in the message queue 1471p to the workers 1472p may be of either a PUSH type or a PULL type. In the PUSH-type transmission, processing requests registered with the message queue 1471p are transmitted to the workers 1472p by the message queue 1471p. In the PULL-type transmission, each worker 1472p polls the message queue 1471p and, if a processing request is included in the message queue 1471p, extracts the processing request. The presence of the message queue 1471p makes it possible for each worker 1472p to execute processing asynchronously with a processing request. As a result, it is possible to reduce the necessity for a requestor of processing to wait for the completion of the processing by the workers 1472p.

The log collection part 148a collects logs related to processes executed in the application layer 120L and the common service layer 140L from each part and stores the collected logs in a log information storage part 151p in the database layer 150L. The form of collecting logs may also be either a PUSH type or PULL type.

The database layer 150L is a layer including a database that stores various kinds of information. Referring to FIG. 2, the database layer 150L includes the log information storage part 151p, the organization information storage part 152p, the user information storage part 153p, the license information storage part 154p, the apparatus information storage part 155p, the temporary image storage part 156p, a job information storage part 157p, and an application information storage part 158p.

The log information storage part 151p stores logs collected by the log collection part 148a. The organization information storage part 152p stores the attribute information of each of organization users of the cloud service system 1 (hereinafter referred to as "organization information"). The term "organization" refers to a group of one or more individual users, of which examples include enterprises or other associations. The organization information includes an organization ID for identifying the organization. The user information storage part 153p stores the attribute information of each individual user belonging to the organization user (hereinafter referred to as "user information"). The user information includes a user ID for identifying the individual user and a password used for authenticating the individual user. The user information includes the organization ID of an organization to which the individual user belongs as well. This is because it is satisfactory if the uniqueness of the user ID is guaranteed within the organization. That is, in this embodiment, each individual user is identified by the combination of an organization ID and a user ID.

The license information storage part 154p stores, with respect to each organization user, information on a license possessed by the organization user. The license is a license for an apparatus cooperation service. The apparatus cooperation service is basically in one-to-one correspondence with a server application. Accordingly, the license for an apparatus cooperation service may also be a license for a server application.

The apparatus information storage part 155p stores the attribute information of an apparatus 20 used in an organization user (hereinafter referred to as "apparatus information"). The apparatus information includes, for example, identification information for identifying the machine body (individual body) of each apparatus 20.

The temporary image storage part 156p stores a temporary image. The temporary image is data temporarily generated by processing by the workers 1472p. Although the term "image" is used for convenience purposes, the temporary image does not necessarily have to be image data. For example, the temporary image may be text data. The job information storage part 157p stores information related to processing by the workers 1472p. The application information storage part 158p stores, with respect to each organization user or individual user, configuration information with respect to a server application available to the organization user or individual user.

Basically, the server application may access each storage part of the database layer 150L through a corresponding management part in the common service layer 140L. The application information storage part 158a, however, may be directly accessed by each server application.

The management layer 160L is a layer where functions for maintaining and managing the cloud service system 1 are implemented. Referring to FIG. 2, the management layer 160L includes a monitoring part 161p, a deployment part 162p, an account management part 163p, a login management part 164p, and a backup part 165p.

The monitoring part 161p monitors the operations of the application layer 120L, the common service layer 140L, and the database layer 150L (which are hereinafter referred to as "upper three layers"), and detects the occurrence of an abnormality. The deployment part 162p performs software deployment (installation, upgrading, etc.) for the upper three layers. The account management part 163p manages the account of a manager who may log into each of the below-described servers of the upper three layers. The manager refers to a user in an organization that operates the cloud service system 1, and is a term for making a distinction from a user in the apparatus usage environment 2.

The login management part 164p operates as a "step" for logging into the above-mentioned servers by the manager. That is, the manager may log into each server via the login management part 164p.

The backup part 165p executes processes related to the backing up of files containing predetermined information, which are stored in below-described server computers corresponding to the respective parts in the upper three layers. For example, files containing logs and files containing configuration information are to be subjected to backing up. Logs to be backed up by the backup part 165p are different from logs to be collected by the log collection part 148p. Logs to be collected by the log collection part 148p are mainly logs related to the execution of functions by respective parts, while logs to be backed up by the backup part 165p are mainly logs recorded by the system side such as the operating system (OS) of each computer. Logs to be backed up by the backup part 165p, however, may overlap logs to be collected by the log collection part 148p.

The operation layer 170L is a layer where functions for operations carried out by the cloud service system 1 are implemented. Referring to FIG. 2, the operation layer 170L includes a customer information management part 171p, a contract management part 172p, a sales management part 173p, a license management part 174p, and a development environment provision part 175p.

The customer information management part 171p manages information on customers. The customers are basically organization users. The contract management part 172p manages information on contracts made with customers in their usage of apparatus cooperation services. The sales management part 173p manages information on the sales of apparatus cooperation services. The license management part 174p manages, with respect to each customer, information on a license possessed by the customer. The license management part 174p in the operation layer 170L registers information to be set on the operator side and updates the registered information. The information to be set on the operator side includes, for example, license registration and deletion information. On the other hand, the license management part 144p in the common service layer 140L registers information to be set on the user side and updates the registered information. The information to be set on the user side includes information on, for example, the start of use of a license and the end of use of a license.

The development environment provision part 175p provides a developer with a development environment of software with respect to the upper three layers. The developer is, for example, a developer in an enterprise that operates the cloud service system 1. The development environment provided by the development environment provision part 175p may be made open to software vendors outside the enterprise.

Figure 3:
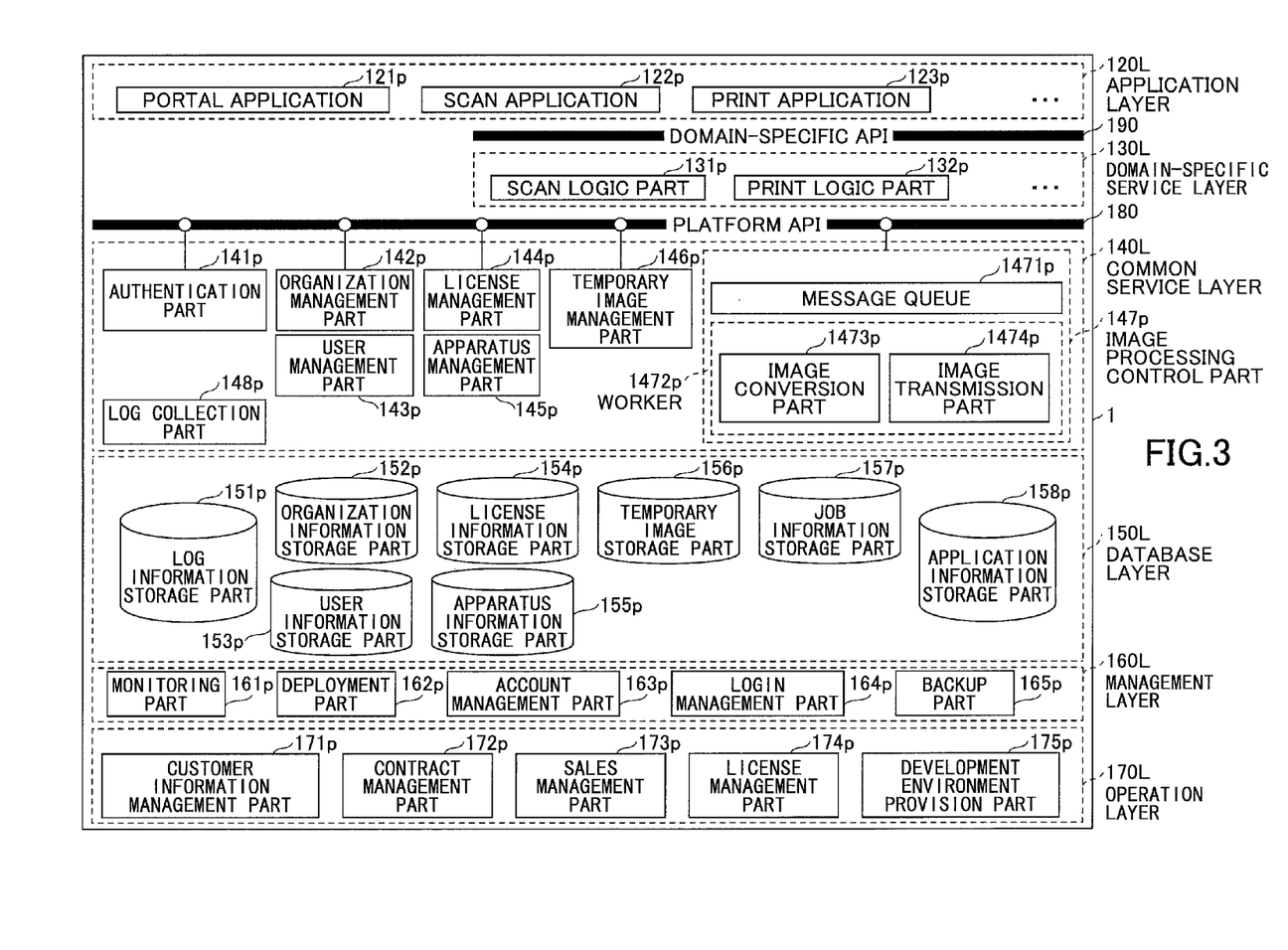
FIG. 3 is a diagram illustrating a second functional configuration of a cloud service system according to an embodiment of the present invention.

The functional configuration of the cloud service system 1 may be implemented as illustrated in FIG. 3. FIG. 3 is a diagram illustrating a second functional configuration of a cloud service system according to an embodiment of the present invention. In FIG. 3, the same elements as those of FIG. 2 are referred to by the same reference characters, and their description is omitted.

Referring to FIG. 3, a domain-specific service layer 130L is provided between the application layer 120L and the common service layer 140L. The domain-specific service layer 130L is a layer that provides services of higher completeness, coarser granularity, or higher applicability than the common service layer 140L. The services provided by the domain-specific service layer 130L are available through a domain-specific API 190. The domain-specific API 190 is an API of coarser granularity than the platform API 180. The domain-specific API 190 may also be made open to the outside.

Referring to FIG. 3, the common service layer 140L includes a scan logic part 131p and a print logic part 132p. The scan logic part 131p executes a logic part of the cloud scan service. The logic part of the cloud scan service is the function of the scan application 122p except for a user interface (UI) function in the configuration of FIG. 2. The user interface function mainly refers to the function of generating and providing a Web UI (Web page). Accordingly, in the configuration of FIG. 3, the main function of the scan application 122p is related to the user interface function as a result of using the scan logic part 131p.

The print logic part 132p executes a logic part of the cloud print service. The logic part of the cloud print service is the function of the print application 123p except for a user interface function in the configuration of FIG. 2. Accordingly, in the configuration of FIG. 3, the main function of the print application 123p is related to the user interface function as a result of using the print logic part 132p.

The provision of the domain-specific service layer 130L and the provision of the domain-specific API 190 make it possible to reduce the amount of source codes to be implemented when other cloud services or the like cooperate with apparatus cooperation services, for example. That is, a single function or method (hereinafter collectively referred to as "method") of the domain-specific API 190 provides a function close to a server application by calling multiple methods of the platform API 180. Accordingly, the domain-specific API 190 is effective in such a case where early cooperation with a service is desired although the service is ready-made. Furthermore, a server application having multiple functions may be implemented using the domain-specific API 190.

On the other hand, in the case where it is desired to implement a unique server application, it is preferable to use the platform API 180.

In the following description, the second functional configuration illustrated in FIG. 3 is employed.

Figure 4:
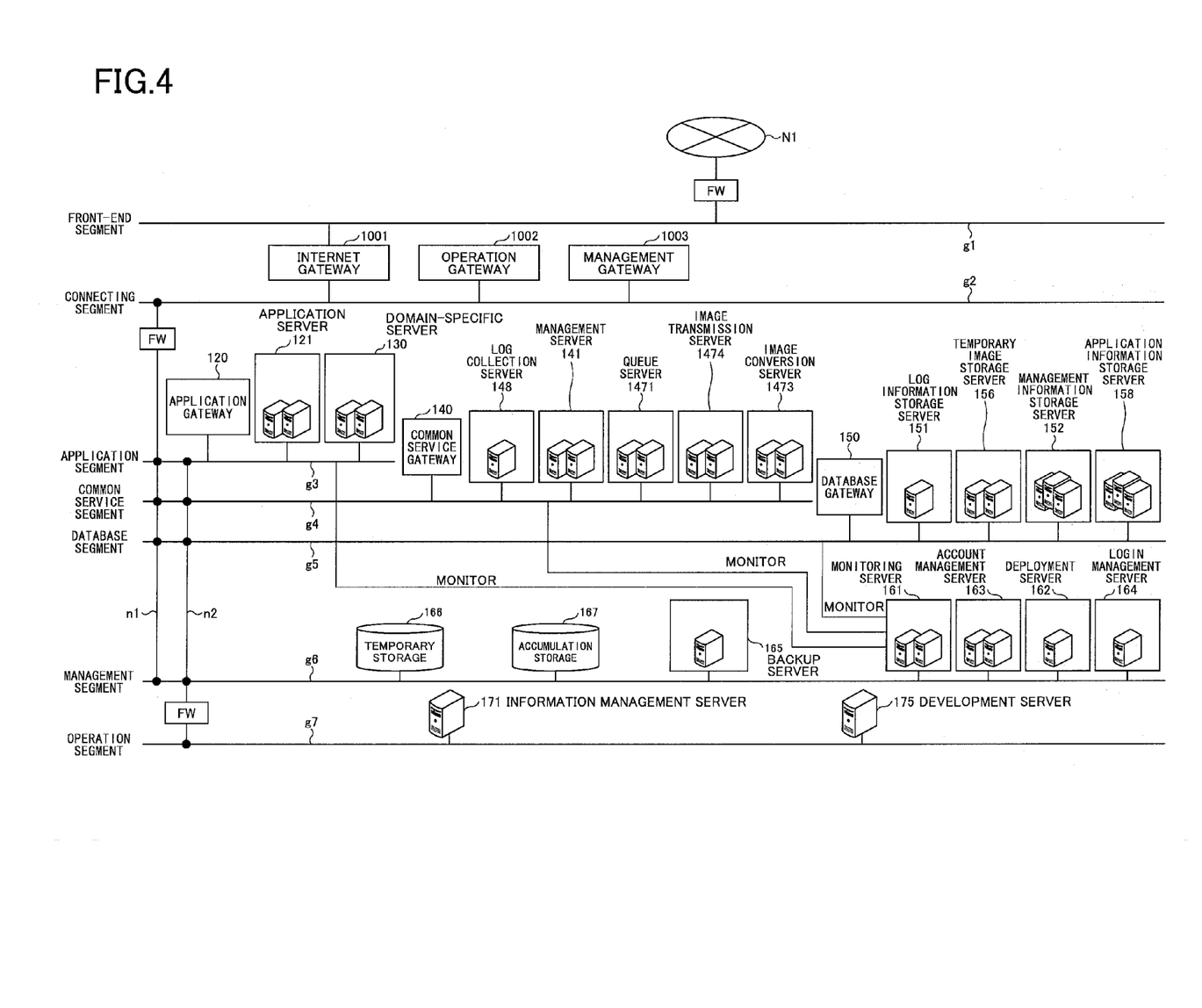
FIG. 4 is a diagram illustrating a network configuration of a cloud service system according to an embodiment of the present invention.

FIG. 4 is a diagram illustrating a network configuration of a cloud service system according to an embodiment of the present invention. Referring to FIG. 4, the cloud service system 1 includes a network divided into seven segments (subnets), which are a front-end segment g1, a connecting segment g2, an application segment g3, a common service segment g4, a database segment g5, a management segment g6, and an operation segment g7, which are simply referred to as "segments g" when making no distinction among them. The term "segment" refers to a unit of a network where IP addresses have a common network address. Each segment may be further divided into segments of a smaller unit.

The front-end segment g1 is the forefront segment to the network N1. A firewall FW is provided between the front-end segment g1 and the network N1.

The connecting segment g2 is a segment for connecting the front-end segment g1 to the application segment g3, the common service segment g4, the database segment g5, and the management segment g6 via a firewall FW. Gateways such as an Internet gateway 1001, an operation gateway 1002, and a management gateway 1003 are connected to the connecting segment g2. In this embodiment, gateways are apparatuses that balance a load of processing with respect to an external message and determine whether to allow passage of a message. Firewalls FW also determine whether to allow passage of a message. The difference, however, lies in that while firewalls FW monitor the TCP/IP layers, gateways monitor the HTTP layer, which is a layer higher than the TCP/IP layer. For example, firewalls FW determine whether to allow passage of a packet based on the IP address of at least one of the source and the destination of the packet and a port number. On the other hand, gateways determine whether to allow passage of a message based on, for example, the uniform resource locator (URL) of at least one of the source and the destination of the message.

The Internet gateway 1001 is a gateway that processes messages via the network N1. Accordingly, messages via the network N1 are first received by the Internet gateway 1001.

The operation gateway 1002 is a gateway that processes messages from the operation segment g7. The operation segment g7 corresponds to part of the intra-WAN of the operator (operating enterprise) of the cloud service system 1. The other segments g1 through g6 also constitute the intra-WAN. Accordingly, for example, when a developer or the like of software related to the cloud service system 1 tests or uses a server application using a computer connected to the operation segment g7, a message from the computer is received by the operation gateway 1002 via the intra-WAN without going through the network N1.

A description is given below of the management gateway 1003.

The application segment g3 is a segment corresponding to the application layer 120L and the domain-specific service layer 130L in FIG. 3. An application gateway 120, an application server 121, and a domain-specific server 130 are connected to the application segment g3.

The application gateway 120 is a gateway that processes messages to the application segment g3. The application server 121 is a computer that implements the application layer 120L. That is, a server application is implemented in the application server 121. Referring to FIG. 3, two housings are graphically represented with respect to the application server 121. This indicates that the application server 121 has a redundant configuration. The same is the case with other servers. A redundant configuration may also be adopted for a server for which only one housing is graphically represented.

The domain-specific server 130 is a computer that implements the domain-specific service layer 130L. Accordingly, the domain-specific API 190 is provided by the domain-specific server 130. Furthermore, one or more programs that cause a computer to operate as the scan logic part 131p and the print logic part 132p are installed in the domain-specific server 130.

In the case where a third-party vendor different from the operator of the cloud service system 1 implements a server application, for example, the application segment g3 may be divided into a segment under the management of the operator and a segment available to the third-party vendor.

The common service segment g4 is a segment corresponding to the common service layer 140L. That is, the platform API 180 is provided by a group of computers connected to the common service segment g4. The platform API 180 and the domain-specific API 190 are called via a network. For example, representational state transfer (REST) may be used in implementing an API via a network. Alternatively, the platform API 180 and the domain-specific API 190 may be implemented using other communication protocols.

A common service gateway 140, a log collection server 148, a management server 141, a queue server 1471, an image transmission server 1474, and an image conversion server 1473 are connected to the common service segment g4. The common service gateway 140 is a gateway that processes messages to the common service segment g4. The log collection server 148 is a computer that operates as the log collection part 148p. That is, a program that causes a computer to operate as the log collection part 148p is installed in the log collection server 148. The management server 141 is a computer that operates as the authentication part 141p, the organization management part 142p, the user management part 143p, the apparatus management part 145p, and the license management part 144p. That is, one or more programs that cause a computer to operate as the authentication part 141p, the organization management part 142p, the user management part 143p, the apparatus management part 145p, and the license management part 144p are installed in the management server 141. The parts 141p through 145p implemented by the management server 141 may be implemented by different computers, respectively.

The queue server 1471 is a computer that operates as the message queue 1471p. That is, a program that causes a computer to operate as the message queue 1471p is installed in the queue server 1471. The image transmission server 1474 is a computer that operates as the image transmission part 1474p, which is one of the workers 1472p. That is, a program that causes a computer to operate as the image transmission part 1474p is installed in the image transmission server 1474. The image conversion server 1473 is a computer that operates as the image conversion part 1473p, which is one of the workers 1472p. That is, a program that causes a computer to operate as the image conversion part 1473p is installed in the image conversion server 1473.

The queue server 1471, the image transmission server 1474, and the image conversion server 1473 constitute the image processing control part 147p.

The database segment g5 is a segment corresponding to the database layer 150L of FIG. 3. A database gateway 150, a log information storage server 151, a temporary image storage server 156, a management information storage server 152, and an application information storage server 158 are connected to the database segment g5.

The database gateway 150 is a gateway that processes messages to the database segment g5. The log information storage server 151 is a computer that operates as the log information storage part 151p. The temporary image storage server 156 is a computer that operates as the temporary image management part 146p and the temporary image storage part 156p. The management information storage server 152 is a computer that operates as the organization information storage part 152p, the user information storage part 153p, the license information storage part 154p, the apparatus information storage part 155p, and the job information storage part 157p. The application information storage server 158 is a computer that operates as the application information storage part 158p. In the computers in the database segment g5, programs (for example, database management system (DBMS)s) that cause the computers to operate as the corresponding storage parts are installed.

The management segment g6 is a segment corresponding to the management layer 160L. A monitoring server 161, an account management server 163, a deployment server 162, a login management server 164, a backup server 165, a temporary storage 166, and an accumulation storage 167 are connected to the management segment g6.

The monitoring server 161 is a computer that operates as the monitoring part 161p. That is, a program that causes a computer to operate as the monitoring part 161p is installed in the monitoring server 161. The account management server 163 is a computer that operates as the account management part 163. That is, a program that causes a computer to operate as the account management part 163p is installed in the account management server 163. The deployment server 162 is a computer that operates as the deployment part 162p. That is, a program that causes a computer to operate as the deployment part 162p is installed in the deployment server 162. The login management server 164 is a computer that operates as the login management part 164p. That is, a program that causes a computer to operate as the login management part 164p is installed in the login management server 164.

The backup server 165 is a computer that operates as the backup part 165p. That is, a program that causes a computer to operate as the backup part 165p is installed in the backup server 165.

The temporary storage 166 is a storage device that temporarily stores a duplicate copy (backup file) of a file to be backed up in each of the servers connected to the application segment g3, the common service segment g4, or the database segment g5. Specifically, the temporary storage 166 stores a backup file of a file in the latest condition (version) in each server at the time of executing the last backup process. That is, the temporary storage 166 may be said to store a snapshot of a file to be backed up at some point in time.

The accumulation storage 167 is a storage device that stores backup files for generations. For example, the backup server 165 stores backup files stored in the temporary storage 166 in the accumulation storage 167 with predetermined timing. At this point, new backup files are stored separately from the backup files that have been stored in the accumulation storage 167 before. That is, in the accumulation storage 167, backup files of the same file are stored separately in accordance with the time (period) of their storage in the temporary storage 166. As a result, the generations of backup files are managed by the accumulation storage 167. Each of the temporary storage 166 and the accumulation storage 167 may be implemented using, for example, a network attached storage (NAS).

The operation segment g7 is a segment corresponding to the operation layer 170L of FIG. 3. An information management server 171 and a development server 175 are connected to the operation segment g7. The information management server 171 is a computer that operates as the customer information management part 171p, the contract management part 172p, the sales management part 173p, and the license management part 174p. That is, one or more programs that cause a computer to operate as these parts 171p through 174p are installed in the information management server 171. The development server 175 is a computer that operates as the development environment provision part 175p. That is, a program that causes a computer to operate as the development environment provision part 175p is installed in the development server 175.

The license management part 174p in the information management server 171 copies license information stored in the information management server 171 to the license management part 144p in the management server 141 of the common service segment g4. A message for this copy is transmitted to the license management part 144p via the management gateway 1003. That is, the management gateway 1003 is used for the license management part 174p to copy license information to the license management part 144p. The license information is information of extremely high confidentiality.

Therefore, the management gateway 1003 that restricts messages with higher security is used in copying the license information.

Furthermore, in FIG. 4, a network group n1, which starts at the connecting segment g2 and ends at the management segment g6, is a network group that is used to transmit messages received in the gateways 1001 through 1003 in the connecting segment g2, perform communications according to the messages, and perform communications for the monitoring of servers by the monitoring server 161. The network group n1 is a group of networks each connecting corresponding two of the segments between the connecting segment g2 and the management segment g6. That is, the segments are connected by independent networks each connecting corresponding two of the segments. A firewall FW (not graphically represented) is provided in each of the inter-segment networks. Accordingly, high security is ensured for inter-segment communications as well.

The network group n1 does not reach the operation segment g7 in order to prevent access to the operation segment g7 (intra-WAN) from outside the intra-WAN of the operator of the cloud service system 1.

Furthermore, a network group n2, which starts at the operation segment g7 and ends at the application segment g3, is a network group used to access the segments from the operation segment g7 for operation purposes. The network group n2 is a group of networks each connecting corresponding two of the segments between the operation segment g7 and the application segment g3. A firewall FW (not graphically represented) is provided in each of the inter-segment networks.

As illustrated in FIG. 4, the network of the cloud service system 1 is divided into segments corresponding to the layers in the functional configuration of FIG. 3. The layers are classified by functional or obligational commonality. Furthermore, the calling relationship between parts over layers has commonality layer by layer. Accordingly, with respect to firewalls FW, whether to allow passage of a message may be set not server by server but segment by segment. If there is an exceptional server, settings may be configured with respect to the exceptional server.

Figure 5:
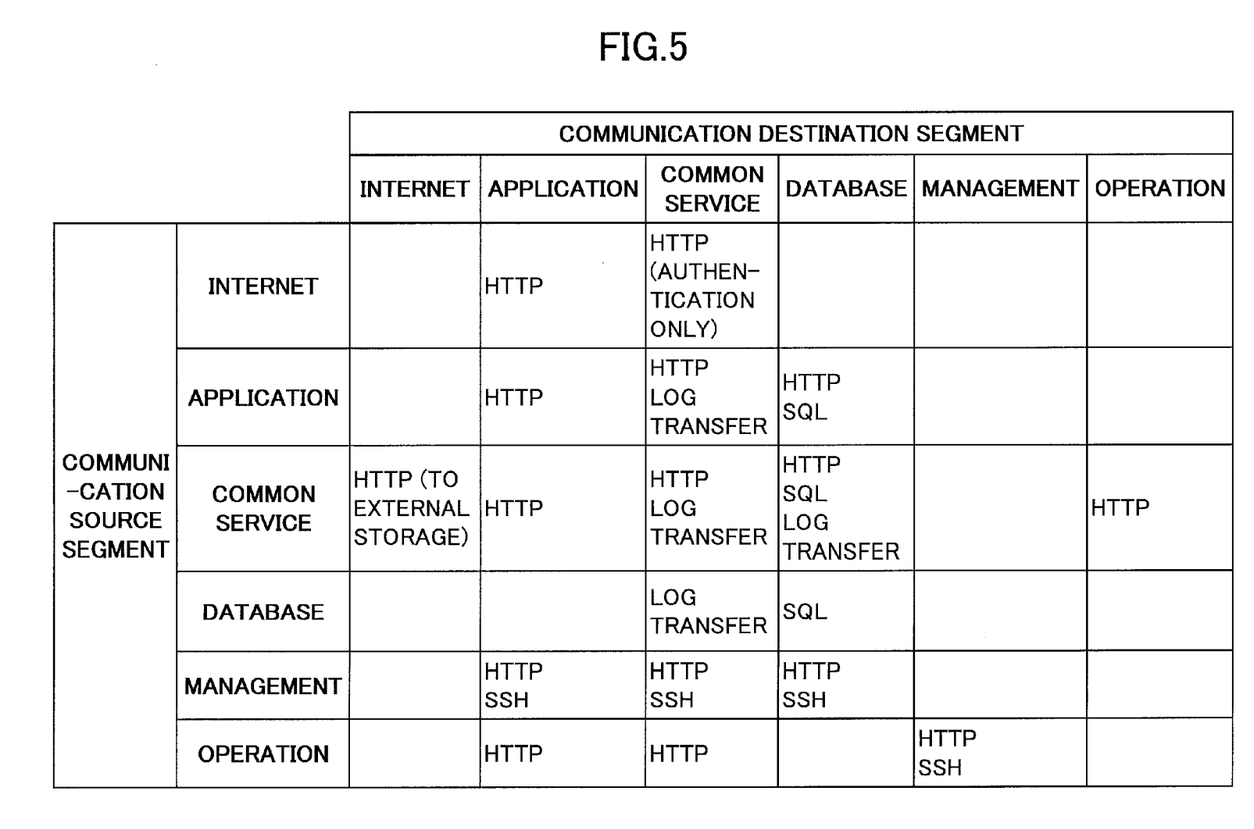
FIG. 5 is a diagram illustrating communications allowed by a firewall.

For example, FIG. 5 is a diagram illustrating communications allowed by a firewall. FIG. 5 illustrates the contents of an allowed communication (such as a communication protocol or a communication purpose) with respect to each combination of a communication source segment and a communication destination segment. In FIG. 5, "SSH"(Secure Shell) is a communication protocol used for authentication. Furthermore, "INTERNET" corresponds to the network N1 in this embodiment.

According to FIG. 5, communications from the Internet are allowed with respect to the application segment g3 and are not allowed with respect to other segments. Exceptionally, however, communications regarding an authentication request are allowed with respect to the common service segment g4.

Furthermore, communications in the same segment are basically allowed.

Furthermore, communications from the application segment g3 to the common service segment 4 and the database segment g5 are allowed. The communications from the application segment g3 to the common service segment g4 include calling the platform API 180 and transferring a log to the log collection server 148. The communications from the application segment g3 to the database segment g5 are mainly communications for accessing the application information storage server 158.

Furthermore, communications from the common service segment g4 to the Internet, the application segment g3, and the database segment g5 are allowed. As described below, the communications from the common service segment g4 to the Internet are required in the case of storing image data in an external storage such as a storage service. The communications from the common service segment g4 to the application segment g3 are mainly communications for transmitting a response to a processing request registered with the queue server 1471. That is, because the response is made asynchronously with the processing request (is called back), the communications from the common service segment g4 to the application segment g3 need to be allowed. The communications from the common service segment g4 to the database segment g5 are communications for accessing the storage parts in the database layer 150L from the common service layer 140L.

Communications from the management segment g6 to the application segment g3, the common service segment g4, and the database segment g5 are allowed.

Communications from the operation segment g7 to the application segment g3, the common service segment g4, and the management segment g6 are allowed.

Basically, communications from any segment to the operation segment g7 are prevented. Exceptionally, however, communications from the license management part 144p in the management server 141 of the common service segment g4 to the license management part 174p of the information management server 171 of the operation segment g7 are allowed.

Figure 6:
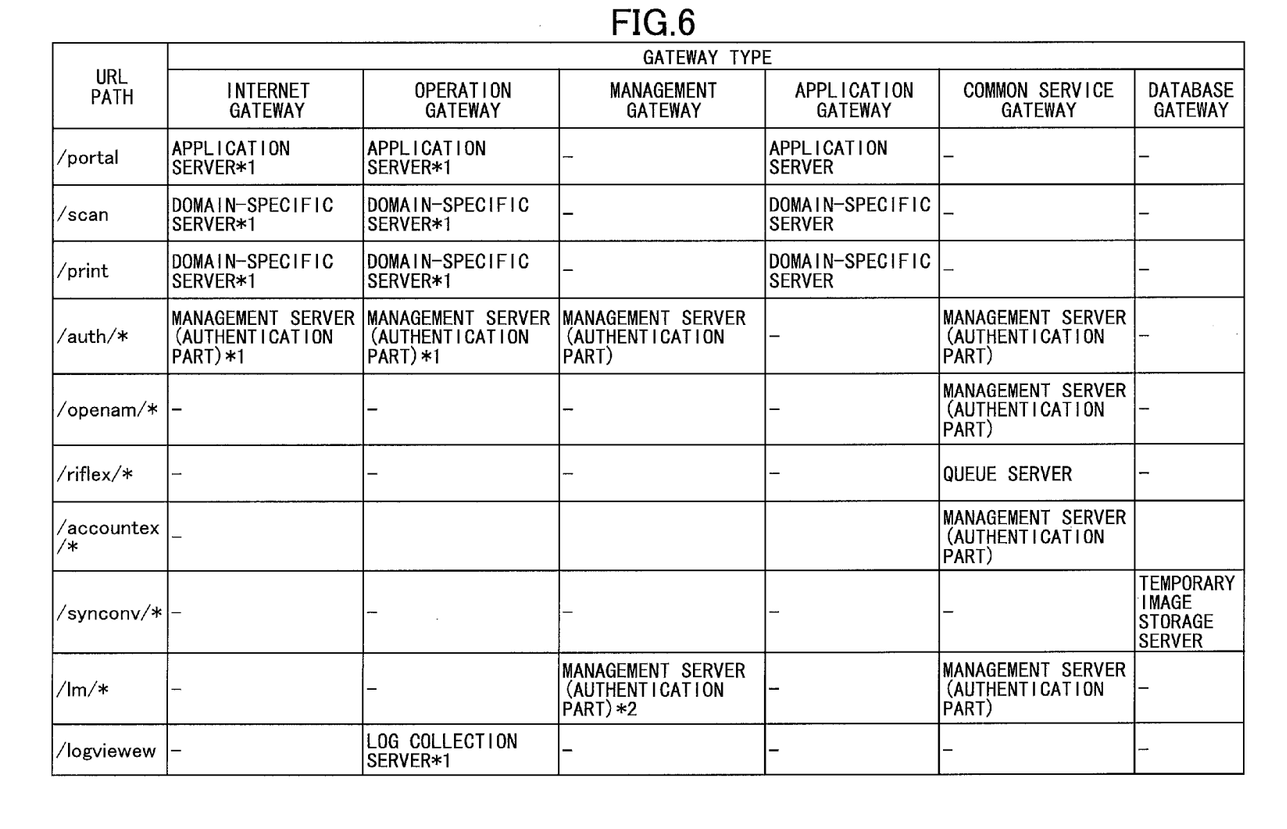
FIG. 6 is a diagram for illustrating control of communications by each gateway.

Furthermore, FIG. 6 is a diagram for illustrating control of communications by each gateway. FIG. 6 illustrates, with respect to each URL path, a destination to which each gateway transfers, when receiving a message related to a URL including the path, the received message. In FIG. 6, "- (hyphen)" indicates that passage of a message related to the corresponding URL is prevented. Furthermore, "*1" indicates that an HTTPS (Hypertext Transfer Protocol Security) communication of an SSL server certificate is accepted in addition to HTTP communications. Furthermore, "*2" indicates that a communication of an SSL client certificate is accepted. In FIG. 6, some URL paths are omitted. For example, "/portal" indicates "/portal" and other URLs that start with "/portal". The same applies to other URLs.

For example, messages having a URL path "/portal" may be received by the Internet gateway 1001, the operation gateway 1002, and the application gateway 120. These gateways 1001, 1002, and 120 transfer the messages to the application server 121. The messages basically relate to requests to obtain a Web UI (Web page).

Messages having a URL path "/scan" or "/print" may be received by the Internet gateway 1001, the operation gateway 1002, and the application gateway 120. These gateways 1001, 1002, and 120 transfer the messages to the domain-specific server 130. Specifically, "/scan" corresponds to the scan logic part 131p and "/print" corresponds to the print logic part 132p.

Messages having a URL path "/auth/*" may be received by the Internet gateway 1001, the operation gateway 1002, the management gateway 1003, and the common service gateway 140. These gateways 1001, 1002, 1003, and 140 transfer the messages to the authentication part 141p of the management server 141. The messages relate to authentication requests.

Messages having a URL path "/openam/*" may be received by the common service gateway 140. The common service gateway 140 transfers the messages to the authentication part 141p of the management server 141.

Messages having a URL path "/riflex/*" may be received by the common service gateway 140. The common service gateway 140 transfers the messages to the queue server 1471.

Messages having a URL path "/accountex/*" may be received by the common service gateway 140. The common service gateway 140 transfers the messages the authentication part 141p of the management server 141.

Messages having a URL path "/synconv/*" may be received by the database gateway 150. The database gateway 150 transfers the messages to the temporary image storage server 156.

Messages having a URL path "/lm/*" may be received by the management gateway 1003. The management gateway 1003 transfers the messages to the authentication part 141p of the management server 141. The messages relate to authentication requests from the license management part 174p of the information management server 171.

Messages having a URL path "/logviewer" may be received by the operation gateway 1002. The operation gateway 1002 transfers the messages to the log collection server 148. The messages relate to requests to obtain a log at the time of viewing logs. The viewing of logs is authorized in the operation layer 170L. That is, users of the apparatus usage environment 2 are not authorized to view logs. Accordingly, the Internet gateway 1001 is prevented (inhibited) from receiving these messages.

Referring back to FIG. 4, to each of the segments g3 through g7, computers corresponding to the functional parts in a layer (in FIG. 3) corresponding to the segment are connected. By thus installing computers unit by unit with respect to the units classified by functional commonality, it is possible to flexibly address unbalanced loads on functions. That is, the frequency of use and the load may differ from function to function. When loads on functions are not balanced, it is possible to easily level loads on servers by adding one or more computers corresponding to a functional part whose frequency of use or load is high. Specifically, for example, if a load on an image processing server is extremely high so that processing by the image processing server has become a bottleneck, it is possible to reduce the load by adding a computer to the computer(s) of the image processing server.

In view of facilitating the addition of a computer (scaling out), the computers, gateways, and firewalls FW illustrated in FIG. 4 may be implemented by virtual machines. In this case, each segment also is virtualized.

Furthermore, according to this embodiment, a segment that requires higher security is located at a position more distant from the network N1 such as the Internet. Specifically, the database segment g5, which corresponds to the database layer 150L in which information specific to users and should not be leaked, such as log information, organization information, user information, license information, apparatus information, and temporary images, is stored, is located deeper than the application segment g3 and the common service segment g4. As a result, it is possible to ensure high security with respect to the above-described information.

Figure 7:
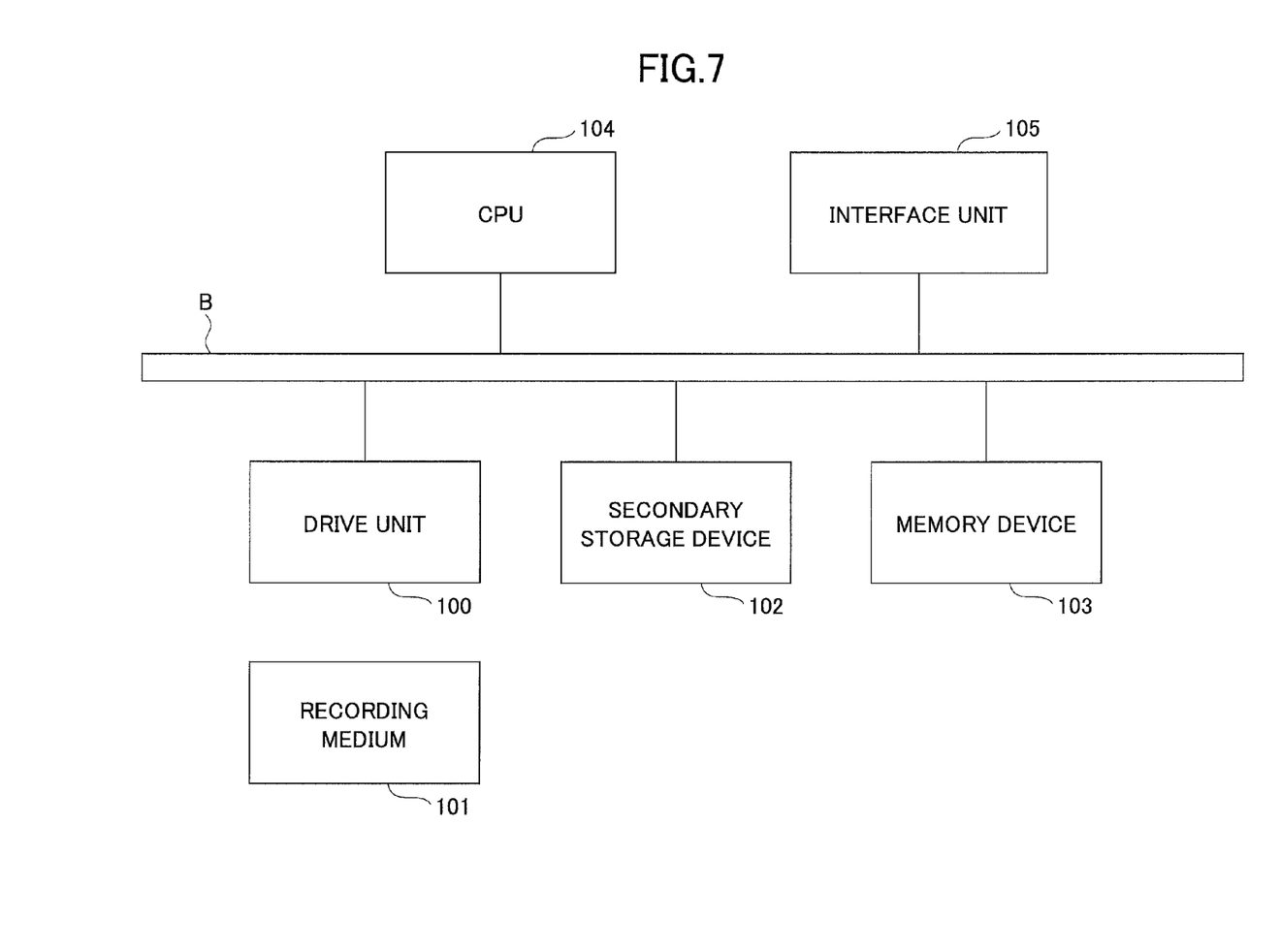
FIG. 7 is a diagram illustrating a hardware configuration of each of computers of a cloud service system according to an embodiment of the present invention.

Next, a description is given of hardware configurations of computers. FIG. 7 is a diagram illustrating a hardware configuration of each of computers of a cloud service system according to an embodiment of the present invention. Each computer includes a drive unit 100, a secondary storage device 102, a memory device 103, a central processing unit (CPU) 104, and an interface unit 105, all of which are interconnected by a bus B.

A program that implements processing in each computer is provided by a recording medium 101 such as a CD-ROM. When the recording medium 101 containing a program is loaded into the drive unit 100, the program is installed into the secondary storage device 102 from the recording medium 101 via the drive unit 100. The program, however, does not necessarily have to be installed from the recording medium 101, and may be downloaded from another computer via a network. The secondary storage device 102 stores the installed program and stores files and data.

The memory device 103 reads a program from the secondary storage device 102 and stores the program in response to a command to activate the program. The CPU 104 executes functions pertaining to the computer in accordance with the program stored in the memory device 103. The interface unit 105 is used as an interface for connecting to a network.

A description is given below of a procedure for a file backup process executed by each server in the cloud service system 1. In the following description, a simple statement of "server or servers" refers to a server or servers connected to the application segment g3, the common service segment g4, or the database segment g5.

Figure 8:
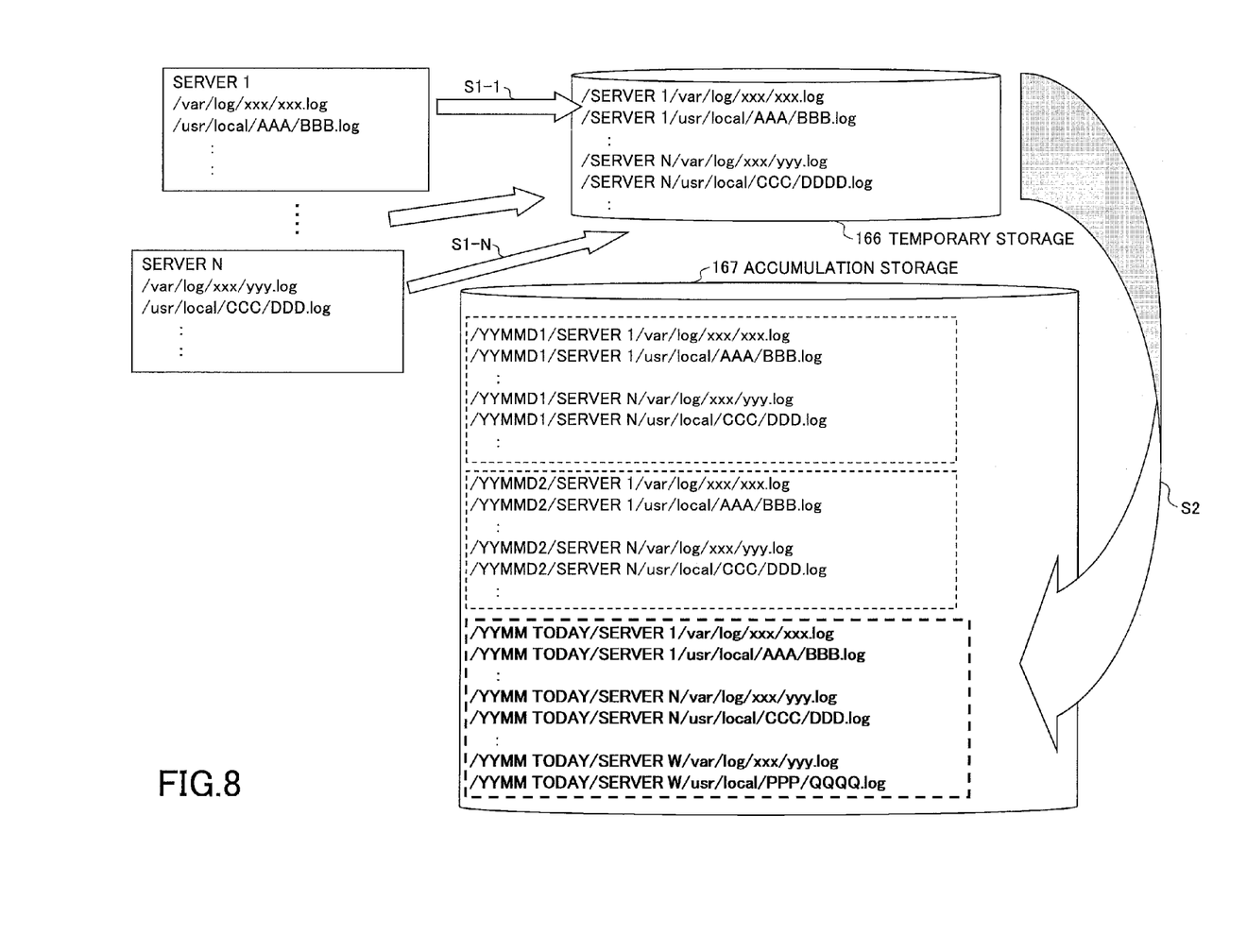
FIG. 8 is a diagram for giving an outline of a file backup process.

First, an outline of the file backup process is given. FIG. 8 is a diagram for giving an outline of the file backup process.

For example, at steps S1-1 through S1-N, each server periodically (for example, once a day) stores, in the temporary storage 166, a duplicate copy of a file to be backed up among the files stored in the server. For example, a file of each server is copied, while retaining the original pathname (directory configuration), under a directory whose directory name is the identification information of the server (for example, a host name). As a result, the latest backups of files of servers are stored separately server by server in the temporary storage 166.

Next, at step S2, the backup server 165 transfers the duplicate copies of the backup files stored in the temporary storage 166 to the accumulation storage 167. At this point, new backup files are stored separately from the backup files that have been stored in the accumulation storage 167 before. As a result, the generations of backup files are managed by the accumulation storage 167. In FIG. 8, generations are separately shown by rectangles defined by broken lines. Alternatively, generations may be separated by, for example, creating directories each having, as a directory name, a date or date and time at which backup files are transferred to the accumulation storage 167, and storing the backup files of each generation in one of the directories corresponding to the generation.

It is desirable that step S2 be executed in the same cycle as steps S1-1 through S1-N. For example, step S2 may be executed after passage of a predetermined time since the execution of steps S1-1 through S1-N in order to ensure that the backup files of each generation are copied to the accumulation storage 167. That is, for example, if step S2 is executed once after steps S1-1 through S1-N are executed twice, the backup files of the first time are lost. In order to avoid such a situation, it is desirable that step S2 be executed in the same cycle as steps S1-1 through S1-N.

A more detailed description is given below of each of the process of backing up files to the temporary storage 166 by servers (S1-1 through S1-N) and the process of transferring backup files from the temporary storage 166 to the accumulation storage 167 (step S2).

Figure 9:
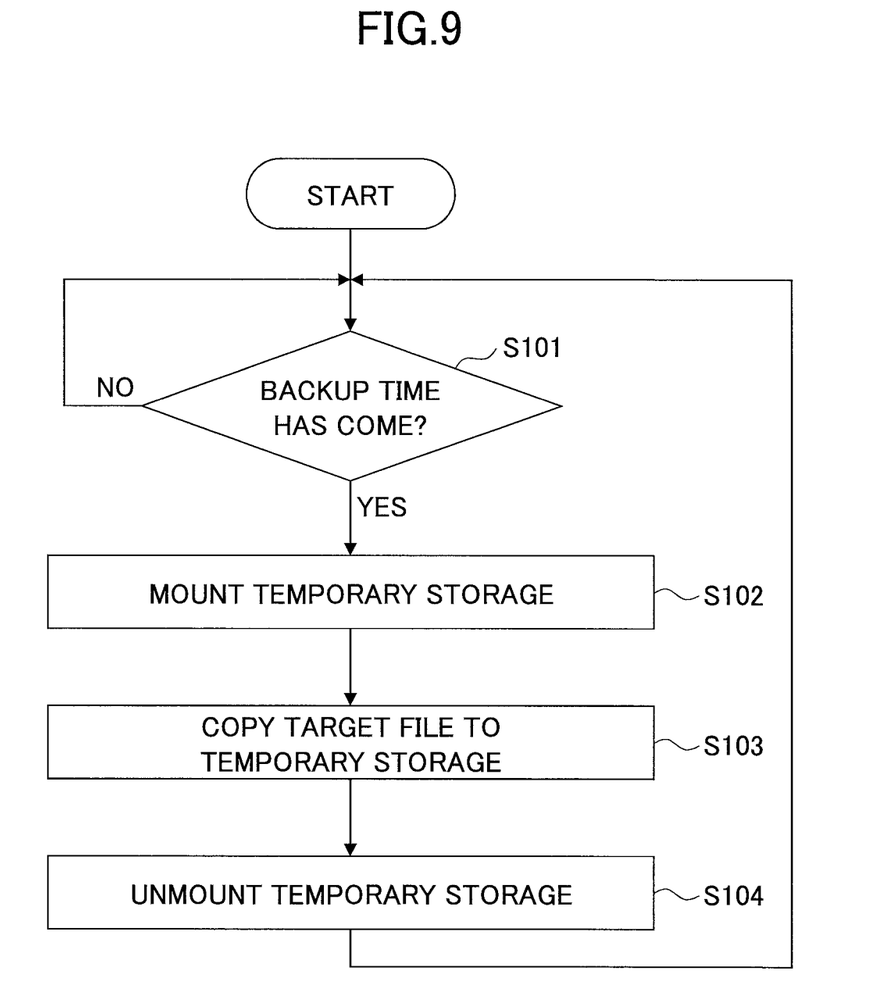
FIG. 9 is a flowchart for illustrating a procedure for a process of backing up files to a temporary storage by servers.

FIG. 9 is a flowchart for illustrating a procedure for a process of backing up files to a temporary storage by servers.

At step S101, the CPU 104 of each server waits for a backup time to come. Information indicating the backup time may be stored in the secondary storage device 102 of each server. When detecting (determining) that the backup time has come (YES at step S102), the CPU 104 of each server mounts a directory whose directory name is the host name of the server in the file system of the temporary storage, for example. This mounting makes a backup area under the directory operable from the server that has mounted the directory. The sharing of a file system via a network may be achieved using NFS (Network File System) or CIFS (Common Internet File System).

Next, at step S103, the CPU 104 of each server copies all or some of files to be backed up to the backup area under the directory of the mounting destination. At this point, each file is copied with its pathname being retained. A list of the pathnames of files to be backed up may be stored in the secondary storage device 102 in each server. The CPU 104 of each server may specify files to be backed up by referring to the list.

As a result of the execution of step S103, the stored contents of the temporary storage 166 are as illustrated in FIG. 8. That is, the files to be backed up of each server are stored under the directory (backup area) of the server. In the case where the backup area of each server is cleared (deleted) every time backing up is executed, files to be backed up may be simply copied. On the other hand, in the case where the backup area of each server is not cleared, the backup files copied at a previous backup time may be replaced with the backup files of a current backup time. At this point, the server may delete files that exist in the backup area but no longer exist in the server from the backup area.

At step S104, when the copying of files to be backed up is completed, the CPU 104 of each server unmounts the directory corresponding to the server in the temporary storage 166. As a result, the backup area under the directory is made inoperable.

Thus, the temporary storage 166 is mounted only for a period during which a backup process is executed. Specifically, mounting is performed prior to the storage of files in the temporary storage 166, and unmounting is performed after completion of the storage. As a result, the state where the temporary storage is operable from the CPU 104 of each server is limited to a short period of time. Accordingly, even if a malicious person breaks into any of the servers, it is possible to reduce the possibility that the malicious person accesses the temporary storage 166 using the server as a springboard. That is, it is possible to improve security with respect to the backup files stored in the temporary storage 166.

Figure 10:
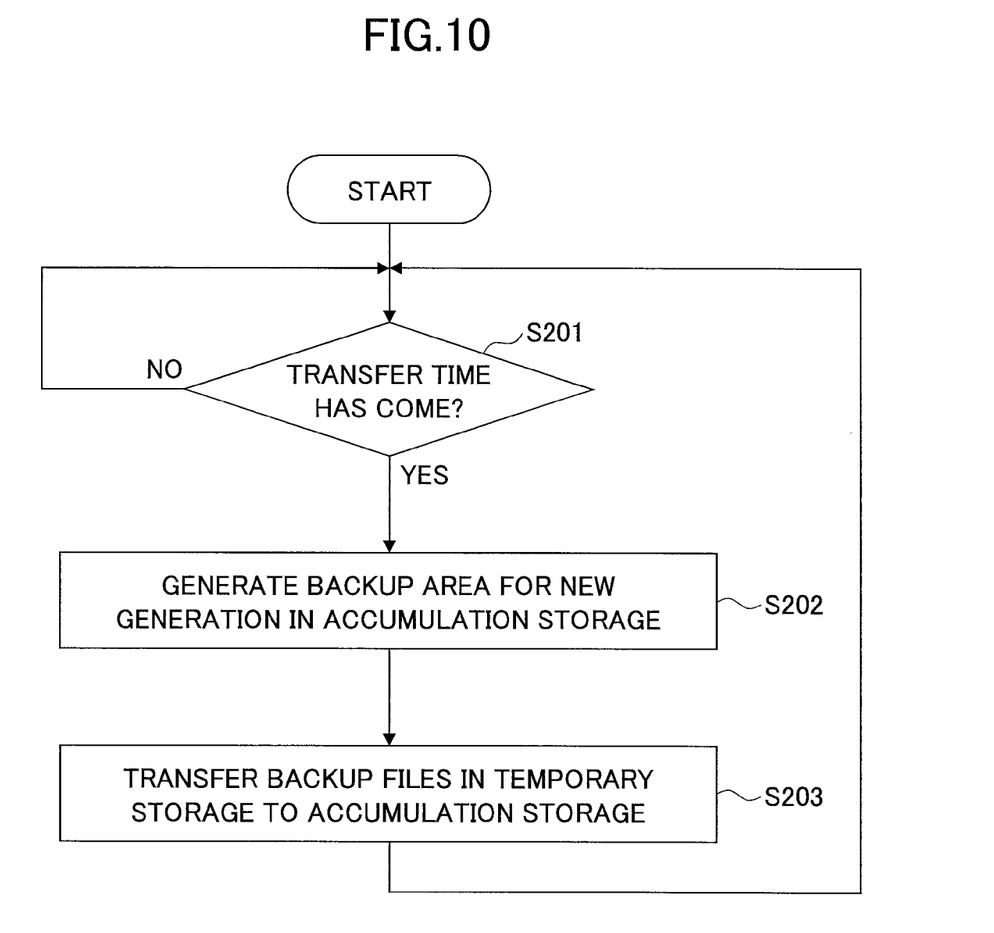
FIG. 10 is a flowchart for illustrating a procedure for a process of transferring backup files from a temporary storage to an accumulation storage.

Next, a detailed description is given of the process of transferring backup files from the temporary storage 166 to the accumulation storage 167. FIG. 10 is a flowchart for illustrating a procedure for a process of transferring backup files from a temporary storage to an accumulation storage.

At step S201, the backup server 165 waits for a time to transfer backup files from the temporary storage 166 to the accumulation storage 167 (a transfer time) to come. The transfer time may be, for example, the time at which a predetermined time has passed since the backup time at step S101 in FIG. 9. Furthermore, information indicating the transfer time may be stored in the secondary storage device 102 of the backup server 165.

When detecting (determining) that the transfer time has come (YES at step S201), at step S202, the backup server 165 generates a backup area for storing the backup files of a new generation in the accumulation storage 167. For example, a directory whose directory name is the date or date and time of a current transfer is generated in the accumulation storage 167 as a backup area for the new generation.

Next, at step S203, the backup server 165 transfers (copies) the backup files stored in the temporary storage 166 to the backup area corresponding to the new generation in the accumulation storage 167. As a result, the stored contents of the accumulation storage 167 are, for example, as illustrated in FIG. 8.

For example, in the case where the number of generations to be managed is finite (for example, five generations) and the generation transferred at step S203 is the $(5n+1)^{th}$ (where n is an integer greater than or equal to one) generation, a directory name corresponding to the backup area of the oldest generation may be updated to the date or date and time of a current transfer. In this case, at step S203, the backup files stored in the temporary storage 166 may be overwritten on the backup area. At this point, files that do not exist in the temporary storage 166 but exit in the backup area may be deleted.

Thus, the files of each server periodically backed up to the temporary storage 166 have their generations managed in the accumulation storage 167. Accordingly, for example, even if a malicious person intrudes any of the servers and alters any of the log files in order to erase the trace of the intrusion, it is possible to increase the possibility of detecting the alteration of the log file and the intrusion by the malicious person by analyzing the inter-generation difference of the log file.

Backup files may be compressed (converted into an archive file) at the time of their backing up to the temporary storage 166 or at the time of their transfer to the accumulation storage 167. This makes it possible to reduce consumption of the storage capacity of the temporary storage 166 or the accumulation storage 167.

Furthermore, each server may store different files in the temporary storage 166 in different cycles. For example, in each server, important files may be backed up once in several minutes or the like, and other files may be backed up at once a day or the like.

In this case, a list of files to be backed up may be stored frequency by frequency (or cycle by cycle) in each server. For example, a file containing a list of the pathnames of files that are backed up every minute (hereinafter referred to as "first configuration file") and a file containing a list of the pathnames of files that are backed up every day (hereinafter referred to as "second configuration file") are prepared. Each server refers to the first configuration file and executes the process illustrated in FIG. 9 every minute. Furthermore, each server refers to the second configuration file and executes the process illustrated in FIG. 9 every day.

The backup server 165 may execute the process illustrated in FIG. 10 in a cycle corresponding to the highest frequency (for example, every minute). Alternatively, information indicating the frequency or cycle of backing up may be stored server by server and file by file in the secondary storage device 102 of the backup server 165. In this case, the backup server 165 may execute the process of FIG. 10 file by file in a cycle corresponding to the file.

Furthermore, a configuration where the temporary storage 166 and the accumulation storage 167 are not distinguished may be employed. For example, each server may store files generation by generation in the accumulation storage 167. In this case, however, although temporarily, it is possible to access the accumulation storage 167 from each server. As a result, although temporarily, a malicious person may access the accumulation storage 167 using each server as a springboard. On the other hand, by separating the temporary storage 166 and the accumulation storage 167 to prevent the accumulation storage 167 from being operated from each server as in the above-described embodiments, it is possible to ensure higher security with respect to the backup files stored in the accumulation storage 167.

Furthermore, according to the above-described embodiments, all the histories (generations) of configuration information and logs in multiple servers are gathered in the accumulation storage 167. Accordingly, it is possible for a manager who needs these configuration information and logs to easily obtain necessary information by referring to the stored contents of the accumulation storage 167. That is, in the case where each server stores the history of configuration information and logs, a manager is required to access each server. According to the above-described embodiments, however, it is possible to reduce such a workload.

Furthermore, by storing backups and managing their generations in the accumulation storage 167 with respect to not only logs but also configuration information, it is possible to increase the possibility of easily recovering the configuration information of a server even if the configuration information is mistakenly deleted.

In the above-described embodiments, the cloud service system is an example of an information processing system. The temporary storage 166 is an example of a first storage part. The accumulation storage 167 is an example of a second storage part. The backup server 165 or the backup part 165*p* is an example of a transfer part. The database segment g5 is an example of a first segment. The common service segment g4 is an example of a second segment. The application segment g3 is an example of a third segment. The CPU 104 is an example of a control part.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An information processing system, comprising:
   a plurality of information processors each including
      a control part configured to periodically store a duplicate copy of at least a part of predetermined information stored inside the information processor in a first storage part, wherein the control part is configured to
      cause the first storage part to be operable from the information processor prior to storing the duplicate copy in the first storage part,
      store the duplicate copy after causing the first storage part to be operable, and
      cause the first storage part to be inoperable from the information processor after completion of storing the duplicate copy;
   a first segment to which a first one of the plurality of information processors is connected;
   a second segment to which a second one of the plurality of information processors is connected, wherein, in response to calling of a predetermined application programming interface, the second one of the plurality of information processors executes a process corresponding to the called predetermined application programming interface using the at least part of the predetermined information stored in the first one of the plurality of information processors; and
   a third segment to which a third one of the plurality of information processors is connected, wherein, in response to a request from outside the information processing system, the third one of the plurality of information processors controls a process corresponding to the request by calling the predetermined application programming interface,
   wherein each of the first one, the second one, and the third one of the plurality of information processors periodically stores the duplicate copy of the at least part of the predetermined information stored therein in the first storage part.

2. The information processing system as claimed in claim 1, further comprising:
   the first storage part;
   a second storage part different from the first storage part; and
   a transfer part configured to transfer the duplicate copies stored in the first storage part from the plurality of information processors to the second storage part,
   wherein the second storage part is configured to separately store the duplicate copies transferred from the first storage part in accordance with a time of storage thereof in the first storage part.

3. The information processing system as claimed in claim 1, wherein the control part of each of the plurality of information processors stores different information items in the first storage part in different cycles.

4. An information processing method in an information system including a plurality of information processors each including a control part configured to periodically store a duplicate copy of at least a part of predetermined information stored inside the information processor in a first storage part, the information processing method comprising:
   causing, by the control part, the first storage part to be operable from the information processor prior to storing the duplicate copy in the first storage part;
   storing, by the control part, the duplicate copy after causing the first storage part to be operable; and
   causing, by the control part, the first storage part to be inoperable from the information processor after completion of storing the duplicate copy,
   wherein a first one of the plurality of information processors is connected to a first segment of the information processing system,
   a second one of the plurality of information processors is connected to a second segment of the information processing system, wherein, in response to calling of a predetermined application programming interface, the second one of the plurality of information processors executes a process corresponding to the called predetermined application programming interface using the at least part of the predetermined information stored in the first one of the plurality of information processors,
   a third one of the plurality of information processors is connected to a third segment of the information processing system, wherein, in response to a request from outside the information processing system, the third one of the plurality of information processors controls a process corresponding to the request by calling the predetermined application programming interface, and
   each of the first one, the second one, and the third one of the plurality of information processors periodically stores the duplicate copy of the at least part of the predetermined information stored therein in the first storage part.

* * * * *